Dec. 18, 1945.   J. P. STEIBEL ET AL   2,391,075
MEASURING DEVICE
Filed Oct. 15, 1943

INVENTORS
JAMES P. STEIBEL
SVERRE MARTINSON
BY
Emerson B. Donnell
ATTORNEY

Patented Dec. 18, 1945

2,391,075

UNITED STATES PATENT OFFICE 2,391,075

MEASURING DEVICE

James P. Steibel and Sverre Martinson, Racine, Wis.

Application October 15, 1943, Serial No. 506,304

3 Claims. (Cl. 33—1)

The present invention relates to measuring devices and more particularly to such devices for measuring the angle of the upstanding edge of a work-piece. A general object of the invention is to improve the construction and operation of devices of this class. A further object is to provide a device which will rapidly and accurately measure the angle of the upstanding edge of a work-piece, such for example as one flange of an angle iron, wing rib or similar piece. A further object is to provide such a device which will give a substantially immediate indication of the angle at any number of locations along the length of the work-piece so as to continuously indicate any desired or other variation in angle from end to end of the work-piece.

Further objects are to provide certain expedients well adapted to accomplish the above objects.

Further objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention as herein expressed.

In the manufacture of certain articles, particularly although not exclusively airplane wings, a great number of small angle braces or ribs are used. These are generally formed with one flange in a plane while the other flange is curved. Also, this latter flange extends from the first at different angles according to the position in the wing where the particular brace is to be located. Furthermore, the angle between the two flanges ordinarily is not constant but varies throughout the length of the brace. This angle is quite critical because the flange must lie accurately in contact with the outer skin or covering of the wing in order to take full advantage of the inherent strength of the parts. The operation of checking the angle or variation of angle in these ribs has been very slow and irksome and the present invention is designed to perform this checking operation with accuracy and dispatch, although it is to be understood that such angle braces or for that matter solid bars or pieces of any nature, for any purpose, having an upstanding edge may be equally well measured with the device of this invention.

Figures 3, 4:
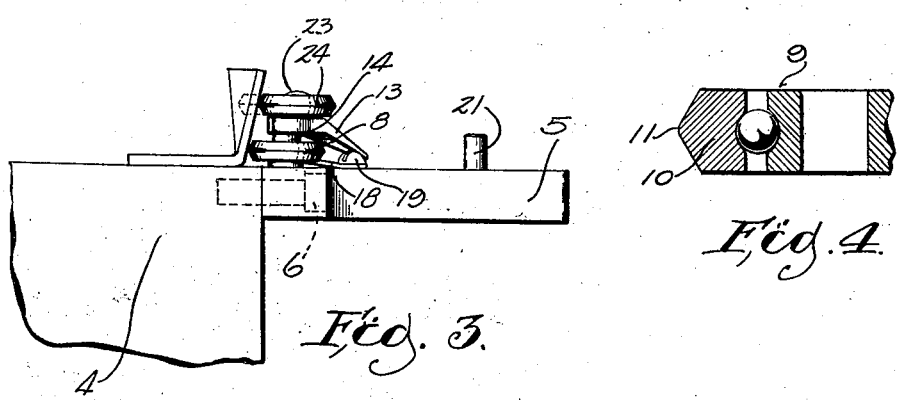
Fig. 3 is a left hand elevation of the device with a work-piece in place showing the parts in a different position from Fig. 1.
Fig. 4 is an enlarged vertical sectional view on the line 4—4 of Fig. 1.

The device depends upon locating the workpiece in a fixed relation on a surface plate and then contacting the upstanding edge at a predetermined distance from the fixed point. The aforementioned edge displaces the contacting means which gives an indication of the angle of the edge. In the present illustrative embodiment, the device is shown as an attachment for a surface plate 4, although it is to be understood that the several working parts to be described presently could be located directly on plate 4, insofar as many advantages of the invention are concerned. In the present instance a base or block 5 is fixed to the edge of plate 4 by suitable means such as screws 6 and 7. Block 5 is shown as flush with the top of surface plate 4, although this is not necessarily so. Block 5 carries a pin 8 on which is journaled a roller or other abutment generally designated as 9 and which preferably projects to some extent over surface plate 4. Roller 9 may be of various construction but conveniently consists of a ball bearing having an outer race of peculiar cross section as more particularly shown in Fig. 4. Said outer race 10 is formed with an outer relatively sharp peripheral ridge 11 for contacting and locating a workpiece in a predetermined position regardless of the angle of the surface presented to the ridge. Roller 9 therefore serves as a reference point from which the device measures the angle of the upstanding edge. Block 5 also carries an upstanding stud or journal 12 on which is pivoted an index lever or pointer 13, collars 14 and 15 being disposed on stud 12 below and above, respectively, index 13. Stud 12 is maintained in position in the present instance by a set screw 16 and has a head 17 which prevents removal of collars 14 and 15 and index 13. Other constructions are contemplated for a pivot for index 13 although that shown has proven satisfactory.

Index 13 is urged in one direction about pivot 12 by means of a spring 18, in the present instance comprising a piece of spring wire fixed at an anchorage 19 on block 5 and so stressed so as to exert a resilient pressure against a pin 20 fixed with index 13. The pressure of spring 18 tends continuously to rotate index 13 in a clockwise direction about pivot 12 as seen from above in Fig. 1. Index 13, when inactive, rests against a stop pin 21 fixed with block 5.

Index 13 cooperates with a scale 22 for indicating the angle of the upstanding edge of the work-piece as aforesaid.

Index 13 has a stud 23, in the present instance on the opposite side of pivot 12 from pin 20 and on which is carried a roller 24 which is preferably similar or identical in construction with above mentioned roller 9, although other contacting means than a roller is considered as within the invention. Upon swinging of index 13, roller 24 will be moved bodily and in an arc about pivot 12, and the dimensions of the parts are so chosen in the present instance that when index 13 indicates zero on scale 22, roller 24 will be directly over above mentioned roller 9, although it is to be understood that other calibrations are contemplated as within the invention when other relations in work-pieces are to be measured.

Figure 1:
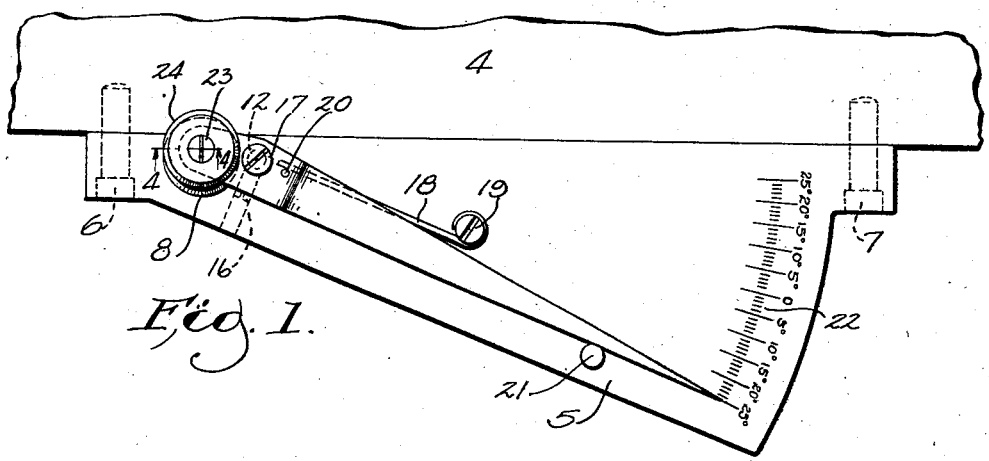
Figure 1 is a plan view of a typical embodiment of the invention as it appears to an operator.
Figure 2:
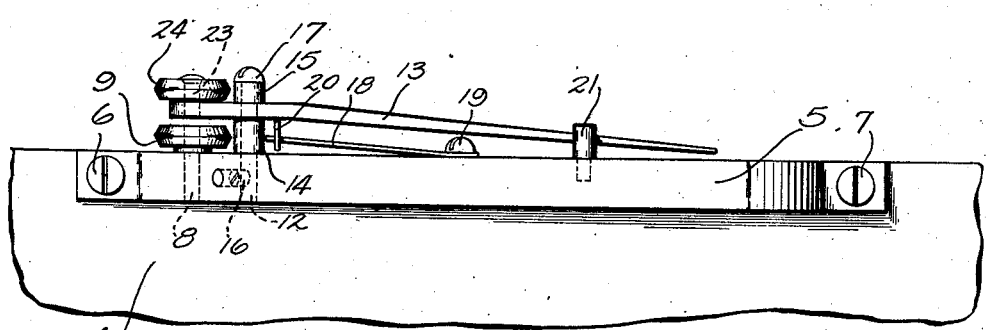
Fig. 2 is a front elevation of the same.

It will now be apparent that a work-piece having a perpendicular upstanding edge, or in other words an edge which is disposed at right angles to an adjacent face thereof, could be placed on surface plate 4 and pressed against roller 9. Under such circumstances, the vertical edge of the work-piece would press against contact roller 24 and move it downwardly as seen in Fig. 1 until it lined up exactly with roller 9. This, as will be apparent from the above, would move index 13 to zero on scale 22. Thus, with the arrangement shown, a piece having a right angled edge would show zero deviation. As will also be apparent, any variation from a right angle would give an indication on one or the other side of the zero mark on scale 2 and this variation may be calibrated in degrees or any other suitable increments. Also, as will be apparent, any other displacement of the portion of the upstanding surface in contact with roller 24 from that in contact with roller 9 will be indicated on scale 22. If a work-piece has a curved edge, no substantial error is introduced into the indications, and the work-piece may be shifted endwise while bearing against rollers 9 and 24 whereupon any variation in angle will be continuously indicated on scale 22 by index 13. Thus, an element such as a wing rib which must have an angle varying according to a predetermined pattern, and which is commonly curved throughout its length, may be checked at any number of control points by pressing it against rollers 9 and 24, the angle being indicated with a high degree of accuracy substantially instantly by index 13. The work-piece may be slid on surface plate 4, rolling against rollers 9 and 24 whereupon a continuous indication of the variation in angle will occur on scale 22.

The above being a complete description of an illustrative embodiment of the invention, what is claimed as new and desired to be secured by Letters Patent of the United States is:

1. In a measuring device for a work-piece having an upstanding edge, the combination of a plate having a substantially flat surface for reception of the work-piece, an abutment roller journaled at a fixed point on the plate in position to locate said upstanding edge, an index fulcrumed on the plate and a scale positioned to cooperate with said index to indicate angles, a contact roller journaled on said index above said abutment roller to be contacted by a portion of said upstanding edge spaced from said abutment roller to be displaced by said edge when the latter is placed in contact with said abutment roller for actuating said index, and spring means for urging said contact roller into contact with said upstanding edge.

2. An attachment for a surface plate, including a base portion attachable to the plate and so disposed and shaped as to form substantially the continuation thereof, an abutment on said base in position to be contacted by a work piece on said plate to guide said work piece into a predetermined position, an index lever fulcrumed on said base, a scale on said base in position to cooperate with said index to indicate angles, contacting means on said lever for swinging said lever in response to contact with a work piece and means for maintaining said contacting means in contact with a work piece for actuating said index in accordance with contours of said work piece.

3. In a measuring device for a work piece, having an upstanding edge, the combination of a plate having a substantially flat surface for reception of a work piece, an abutment disposed at a fixed point on the plate in position to locate said work piece, an index lever fulcrumed on the plate and a scale positioned to cooperate with said index lever to indicate angles, a contact element on said index lever, spaced above said abutment for swinging said index lever in response to contact with a work piece, and means for maintaining said contact element in contact with a work piece for actuating said index lever in accordance with contours of said work piece.

JAMES P. STEIBEL.
SVERRE MARTINSON.